(12) United States Patent
Clouthier

(10) Patent No.: US 6,778,291 B1
(45) Date of Patent: Aug. 17, 2004

(54) FAST PAGE ANALYZER FOR PROPER SELECTION OF COMPRESSION ENGINE FOR RENDERED DATA

(75) Inventor: Scott C. Clouthier, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 707 days.

(21) Appl. No.: 09/591,998

(22) Filed: Jun. 12, 2000

(51) Int. Cl.[7] .............................................. G06F 15/00
(52) U.S. Cl. ..................... 358/1.16; 358/1.15; 358/1.17
(58) Field of Search ............................... 358/1.16, 1.15, 358/1.2, 1.14, 1.13, 470, 443, 444, 448, 474, 468; 382/239, 247, 232, 181, 245, 270

(56) References Cited

U.S. PATENT DOCUMENTS

| | | | |
|---|---|---|---|
| 4,410,916 A | 10/1983 | Pratt et al. ................... 358/263 |
| 4,741,046 A | 4/1988 | Matsunawa et al. ........... 382/9 |
| 4,856,075 A | 8/1989 | Smith ........................... 382/50 |
| 5,073,953 A | 12/1991 | Westdijk ........................ 382/9 |
| 5,303,313 A | 4/1994 | Mark et al. .................... 382/48 |
| 5,704,020 A | 12/1997 | Hanyu et al. ................ 395/102 |
| 5,729,668 A | 3/1998 | Clafflin et al. .............. 395/114 |
| 6,449,393 B1 * | 9/2002 | Peters ......................... 382/239 |

* cited by examiner

Primary Examiner—Twyler Lamb

(57) ABSTRACT

To reduce the memory requirements of a printer, it is desirable to compress rendered data of a to-be-printed page. Specific types of data of a to-be-printed page are best compressed using either lossless or lossy data-compression engines. "Text," "graphics," and "halftone" images are typically best compressed using a lossless engine. "Natural" images (such as photographs) are typically best compressed using a lossy engine. To select the best compression engine, the fast page analyzer divides the page into multiple horizontal strips of multiple horizontal lines. The fast page analyzer concurrently compresses and analyzes each strip. The analysis of one strip determines which compression engine is used to compress the next strip. In effect, each strip predicts the proper engine to compress the next strip. When printing a page that has been compressed in that manner, the printer will decompress each strip using its associated decompressor. The pixels and lines are delivered to a print engine as they are decompressed and in the order that the print engine prints the image onto the paper.

20 Claims, 7 Drawing Sheets

Horzontal lines extend across the page →

TRAVEL GUIDE

⟩ Strip A
⟩ Strip B
⟩ Strip C
⟩ Strip D
⟩ Strip E
⟩ Strip F
⟩ Strip G
⟩ Strip H
⟩ Strip I
⟩ Strip J Strips extend down a page ↓

FAST PAGE ANALYZER FOR PROPER SELECTION OF COMPRESSION ENGINE FOR RENDERED DATA

TECHNICAL FIELD

This invention generally relates to printing devices with memory. More particularly, this invention relates to printing devices that compress rendered data of a to-be-printed page and decompress it before printing.

BACKGROUND

Page printers typically capture an entire page before any image is placed on paper. A typical page printer is a laser printer. A page printed by a laser printer may include one or more of the following elements: "text", "graphics", "halftone" images, or "natural" images.

Data Types

"Text" typically consists of letters, numbers, words, sentences, and paragraphs. Text normally has a font associated with it. The symbols in text are typically represented by codes that direct the printer to generate a rendered version over a given area on a page.

"Graphics" are typically computer-generated images. They usually have sharp edges and sharp color transitions. Graphics may have subtle shadings, but typically include blocks of solid colors. Line-art is a type of graphic consisting entirely of lines, without any shading.

A "halftone" image is typically a printed reproduction of a photograph, using evenly spaced spots of varying diameter to produce apparent shades of gray or color. The darker the shade at a particular point in the image, the larger the corresponding spot (i.e., cell) in the halftone. Newspapers typically print photographs using halftones. With a desktop laser printer, each halftone spot is represented by an area containing a collection of dots.

"Natural" images are digitized images typically captured from the real world. These images are typically captured by a scanner, a digital camera, or frame-grabs of a video signal. They are often digitized representations of photographs. They may be a digitized representation of a document. Unlike halftone images with variable cell sizes, natural images use actual shades of gray and shades of color.

Rendering an Entire Page

In laser printers, either a host computer or the printer itself formats pages containing text, graphics, halftone images, and/or natural image. Since a laser printer's print engine operates at a constant speed, new rendered (i.e., "rasterized") data must be supplied to the print engine at a rate that keeps up with the engine's operating speed.

Typically, a laser printer buffers a full raster bitmap of an entire page so that the print engine always has rendered data awaiting action. Alternatively, a laser printer may store only portions of a page and print them. While the printer is printing portions of a page, it is rendering the next portions of the page.

Mopying

It is desirable for a laser printer to store the rendered data of an entire page before actually printing. One advantage of storing the fully rendered page is the ability to efficiently print multiple original copies ("mopying").

A printer mopies by storing one copy of a page, but printing multiple copies of it. The printer does this without receiving additional copies of the page from the host computer. Dataquest, a San Jose, Calif.-based research group, estimates that forty-three percent of laser-printer users are already producing multiple original prints with their printers. Printer manufacturers prefer to produce printers with mopying capability because it provides a cost-effective, efficient, and timesaving alternative to copying.

Color Conversion

Another advantage of storing the fully rendered page is efficient color conversion. The color standard for incoming data is RGB (Red-Green-Blue). RGB color data is typically represented by twenty-four bits consisting of three color components with eight bits devoted to each. Since each color is represented by one byte, each color may have 256 discrete levels. Mixing levels of RGB results in 16.7 million possible color combinations for each "dot".

A "dot" is the smallest addressable and printable element. Herein, the terms "dot" and "pixel" are used interchangeable. Each dot has value that is associated with a color. The size of that value represents the number of possible colors of the dot. This is called "color depth." Examples of color depth include:

monochrome (1 bit of information per dot)
grayscale (8 bits of information per dot)
color (RGB) (8 or 16 bits of information per dot)
true color (RGB) (24 or 32 bits of information per dot)

The standard for physically printing actual color on paper is not RGB. Rather, it is CMYK (Cyan-Magenta-Yellow-Black). CMYK is a color model in which all colors are described as a mixture of these four process colors. CMYK is the standard color model used in offset printing for full-color documents and in typical desktop color laser printers. Because such printing uses pigments (such as, ink or toner) of these four basic colors, it is often called four-color printing.

Most desktop color laser printers produce their best output when receiving RGB data, rather than CMYK data. The color laser printers include mature technology that automatically, effectively, and accurately converts RGB data to CMYK print results.

The rendered page for one of the color components is called a "color plane." For each RGB color, it is desirable for a color laser printer to store the three color plane of each page. For example, a page where only the red component of the RGB data is rendered is the red color plane of that page.

Unlike color ink-jet printers, the print engine of a color laser printer cannot "pause" and wait for data while the printer is processing it. When this happens in a laser printer, a "laser underrun" error is generated. To ensure that the color laser printer has fully processed to-be-printed color data, the printer converts the three color planes of the RGB data to CMYK data before sending the data to the print engine. By concurrently storing the rendered data of all three RGB color planes of a page, the printer quickly and efficiently converts RGB data into CMYK to send to the print engine for printing without pauses.

Printer Memory Requirements

Memory requirements of a laser printer increase as the dots-per-inch (dpi) resolution and the color depth increases. Black-and-white (b&w) laser printers typically have a one-bit color depth. Such printers from a few years ago had a resolution of three hundred (300) dpi. These printers needed approximately one megabyte (MB) of raster memory for each letter-sized (8.5"×11") page. With a 600 dpi b&w printer having one-bit color depth, approximately 4 MB of memory is required. At one extreme, a color laser printer having a 1200 dpi resolution and a thirty-two (32) bit color depth requires approximately 540 MB of raster memory to store one entire letter-sized page.

It seems that each successive generation of color laser printers produce sharper and more colorful output. In a large part, this is a result of greater resolution and greater color depth. Therefore, there is an apparent need to have a large raster memory in a color laser printer.

In addition the above reasons, speed is another reason for more memory in a printer. A printer needs additional memory to print a series of pages as fast as possible. To avoid printer engine idle time and to run the print engine at its rated speed, printers need additional raster memory to rasterize and store successive pages. Without additional memory, composition of a subsequent page cannot begin until the present page has been printed.

Despite the technological reasons to maximize the raster memory on a color printer, manufacturers prefer to minimize the memory to remain cost competitive. Therefore, substantial effort is directed to reducing the amount of required memory in a laser printer. To reduce the amount of required memory in a laser printer, many conventional printers employ general-purpose data compression techniques.

Data Compression to Minimize Memory Requirements

Generally, data compression techniques encode a stream of digital data signals into compressed digital code signals and decode the compressed digital code signals back into the original data. Data compression refers to any process that attempts to convert data in a given format into an alternative format requiring less space than the original.

Generally, in order for data to be compressible the data must contain redundancy. Compression effectiveness is determined by how successfully the compression procedure uses the inherent redundancy in the original data to compress the data. In data containing text, redundancy occurs both in the non-uniform usage of individual symbols (e.g., digits, bytes, and characters) and in frequent reoccurrence of symbol sequences (e.g., commonly used words, blanks, and white space). In data contain graphics, redundancy occurs in blocks of colors, blocks of color patterns, and white spaces.

The objective of data compression techniques is to effect a savings in the amount of storage required to hold a given body of digital information. Data compression techniques are divided into two general types: "lossless" and "lossy."

Lossless Data Compression

Using lossless techniques, compressed data may be re-expanded back into its original form without any loss of information. The decoded and original data must be identical and indistinguishable with respect to each other.

Lossless data compression techniques are often used with text because the loss or modification of any data is generally considered unacceptable. Otherwise, a letter "A" may turn into a letter "j" or the number "2" may change into a punctuation mark. Blank space may fill with apparently random characters.

Likewise, lossless data compression techniques are often used with graphics for similar reasons. However, instead of letters and numbers changing if a there were data loss during a conversion, graphics would have changes in its colors, lines, and dots. If a lossy technique was used, a straight line may become crooked and a solid color block may get speckles of other colors. Generally, for both text and graphics, lossless compression is used because humans will notice any difference between the original and the decompressed versions of the same data. The differences are so apparent that people may notice "mistakes" without a side-by-side comparison of the original and decompressed versions.

Examples of lossless data compression procedures are 1) the Huffman method, 2) the Tunstall method, and 3) the Lempel-Ziv (LZ) method. Each of these procedures effectively compresses/decompresses text-based data with no loss of data. In addition, each effectively compresses/decompresses graphics-based data with no loss of data. These procedures are well known by those of ordinary skill in the art.

Lossy Data Compression

However, other types of data do not need to use a compression technique that ensures that the decompressed and the original data be identical. Because the human eye is not sensitive to noise, some alteration or loss of information during the compression/decompression process is acceptable. This loss of information gives the "lossy" data compression techniques their name.

Lossy data compression techniques are often used with natural images because the human eye does not notice the small differences between the original and the decompressed versions of the data. People may have difficulty noticing any difference even when comparing the original and decompressed versions side-by-side. However, some implementations of lossy compression techniques can generate artifacts. Artifacts are unwanted effects such as false color and blockiness. Herein, it will be assumed that when data is lossily compressed, such compression is done in a manner to minimize artifacts.

Lossy compression techniques have one significant advantage over lossless techniques. With specific types of data, lossy techniques typically compress data much better than lossless techniques. The effectiveness of a data compression technique is called "compression ratio." The compression ratio is the ratio of data size in uncompressed form divided by the size in compressed form.

An example of a lossy data compression procedure is the JPEG (Joint Photographic Experts Group) method. JPEG can reduce files sizes to about five percent of their original size. JPEG is particularly effective in compressing and decompressing natural-image data. JPEG is well known by those of ordinary skill in the art.

Halftone Images and Lossless Data Compression

Halftone images represent a special case. Since a halftone image is typically a photograph and includes apparent shades of gray or color, it is logical to compress it in the same manner a natural image rather than as text or graphics. Therefore, such a halftone mage seems to be best compressed by a lossy data-compression engine. However, that is not so. Halftone images are best compressed using a lossless engine.

Typically, halftone images include repetitive groupings of pixels (i.e., halftone cells). Since lossless engines work best on data including redundancies, the repetitive nature of the halftone image makes them better to compress using a lossless engine over a lossy engine. In addition, a loss of data in an uncompressed version of a halftone image may produce noticeable blockiness.

Selection of the Best Data Compression Technique

Data compression allows a laser printer to have reduced memory requirement. How reduced that requirement is depends upon the data compression technique or techniques used.

Some conventional laser printers use only one data compression technique. Nearly universally, this is a lossless compression technique because it works on all data types without any fear of data loss. However, lossless techniques generally do a poor job compressing natural images. In other words, lossless techniques have a low compression ratio for natural images.

Some conventional printers compromise and use both lossless and lossy compression techniques. This compromise offers the possibility of maximum data compression for a page; thereby, minimizing the memory requirements. However, such a compromise introduces difficulties in determining when and how to select a particular compression engine.

Two-Pass Page Compression

One conventional solution is a "two-pass" page compression. A first pass over a page is made using a lossless compressor. If the resulting compressed data does not meet some determined size expectations, then a new pass is made over the uncompressed data using a lossy compressor.

This method may cause the same data to be compressed twice (once losslessly and one lossily). This method may miss some potential memory savings because the resulting size was under the expectations. Thus, potential memory savings are lost. This technique can be processor intensive because it may compress the same data twice.

Page Segmentation

Another conventional solution is to decompose a page into sections (i.e., segments). Each section contains primarily either 1) text, graphics or halftone images; or 2) natural images. Once segmented, each section is compressed using the technique that is best suited for its data type. Sections are identified by an analysis of each pixel on a page.

The segments of a page may be blocks or areas anywhere on a page. In some implementations, the segments may resemble a jigsaw puzzle. In other implementations, the segments may resemble rectangular blocks of various sizes.

Although this page segmentation technique is an accurate way to select which compressor to use, it has significant problems. Specifically, the problems include 1) improper segment boundary identification; 2) improper segment data-type identification, 3) lack of speed, and 4) improper piecing back together the "jigsaw" puzzle of segments.

It is difficult to correctly identify segments of a page. The boundaries between differing sections are often incorrectly drawn. Also, the data type of a section is often misidentified. Therefore, the resulting segmentation often produces in less than ideal results.

Page decomposition and composition process is slow, memory intensive, and processor intensive. Typically, the printer's central processor examines each dot on a page. Based upon each dot's surrounding dots, it estimates that a dot is either part of text, graphics, halftone image, or a natural image. This means that multiple lines of dots must be buffered so that this "windowing" operation can be performed for each dot. Comparing each dot to all of its surrounding dots is a slow process because it requires eight comparisons per dot. For a letter-sized page at 600 dpi, that requires approximately two hundred sixty million (260,000,000) comparisons. After the comparisons, additional calculations are performed before each dot can be classified.

After a page is segmented and each segment is compressed according to its identified data type, the segments are uncompressed and pieced back together just before printing the page. During this reconstruction of segments, the "jigsaw pieces" are sometimes improperly put back together. Like the segmentation, this process is also slow, memory intensive, and processor intensive.

Page segmentation cannot be done concurrently with data compression and data decompression. With page segmentation, it is not possible to compress a portion a page while that portion is being analyzed. With page segmentation, it is not possible to send uncompress data to the print engine immediately upon decompression. Page segmentation requires additional processing to piece uncompressed segments back together.

SUMMARY

To reduce the memory requirements of a printer, it is desirable to compress rendered data of a to-be-printed page. Specific types of data of a to-be-printed page are best compressed using either lossless or lossy data-compression engines. "Text," "graphics," and "halftone" images are typically best compressed using a lossless engine. "Natural" images (such as photographs) are typically best compressed using a lossy engine.

To select the best compression engine, the fast page analyzer divides the page into multiple horizontal strips of multiple horizontal lines. Each line contains a series of pixels. The fast page analyzer concurrently compresses and analyzes each strip. The analysis of one strip determines which compression engine is used to compress the next strip. In effect, each strip predicts the proper engine to compress the next strip.

When printing a page that has been compressed in that manner, the printer will decompress each strip using its associated decompressor. The pixels and lines are delivered to a print engine as they are decompressed and in the order that the print engine prints the image onto the paper.

BRIEF DESCRIPTION OF THE DRAWINGS

FIG. 2 is illustration of an exemplary printing page with indicators for exemplary horizontal strips on the page.

DETAILED DESCRIPTION

The following description sets forth a specific embodiment of the exemplary fast page analyzer for proper selection of compression engine for rendered data that incorporates elements recited in the appended claims. This embodiment is described with specificity in order to meet statutory enablement and best-mode requirements. However, the description itself is not intended to limit the scope of this patent. Rather, the inventor has contemplated that the claimed fast page analyzer might also be embodied in other ways, in conjunction with other present or future technologies.

Exemplary Printer Components

Figure 1:
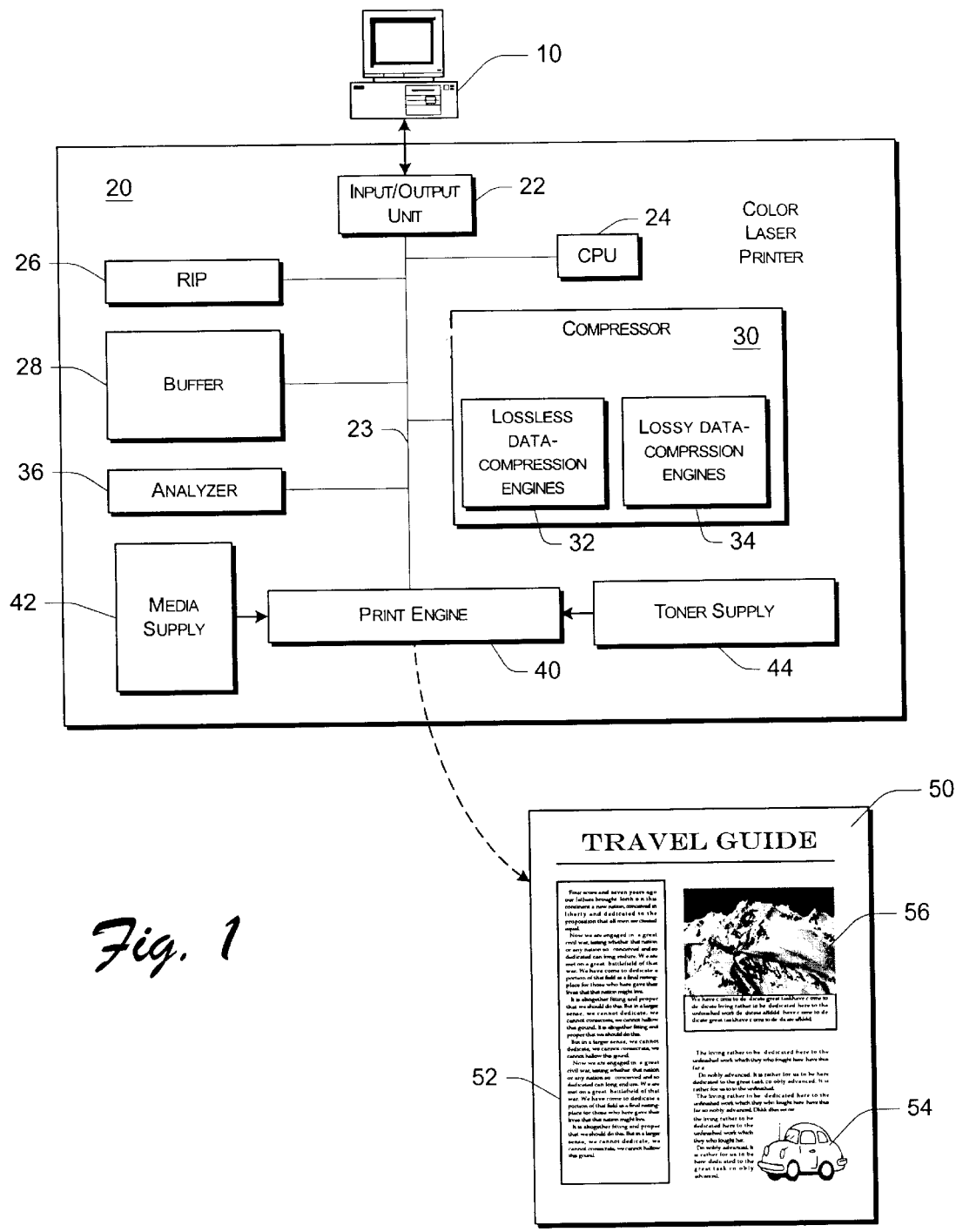
FIG. 1 is a diagrammatic illustration of a laser printer, its host, and an example of a printed page containing "text," "graphics," and a "natural" image. The illustrated laser printer may be used to implement the exemplary fast page analyzer for proper selection of compression engine for rendered data.

FIG. 1 is a diagrammatic illustration of a color laser printer 20 in which the exemplary fast page analyzer may be implemented. Alternatively, it may be implemented on a monochrome laser printer. Furthermore, it may be alternatively implemented in other units that employ printing devices, such as photocopiers, facsimile machines, and the like. For purposes of discussion, the fast page analyzer is described in the context of color laser printers.

FIG. 1 shows a host computer 10 connected to the input/output (I/O) unit 22 of laser printer 20. Typically, the host computer 10 is a personal computer, but it may be any device capable of generating data to send to the laser printer 20 for it to print. The I/O unit 22 includes a physical connection for receiving data to print and print commands and for sending responses to the host 10. Examples of such a physical connection include Universal Serial Bus (USB), standard serial connection, a standard parallel printer connection, etc.

The I/O unit also includes the logic to handle host-printer communication and a connection to the printer bus 23. This bus communicatively couples all internal printer components. Although bus 23 is illustrated here, any conventional and non-conventional internal communications interconnect may be used to accomplish the same internal communications goal.

The following internal printer components are connected to the bus: A general-purpose Central Processing Unit (CPU) 24; a Raster Image Processor (RIP) 26; a buffer 28; a compressor 3; an analyzer 36; and a print engine 40.

As is typical in most printers, the CPU 24 does all of the printer's data processing. For example, data rasterizing, data compression/decompressing, and data analysis are performed by the processor. Alternatively, other components of the printer may have their own processor to do limited processing.

Raster Image Processor (RIP) 26 converts graphics, halftones, and text into a raster (bit-mapped) image. Since natural images are already rendered, the RIP 26 inserts the natural images into the page's raster image into their appropriate page relative positions. The RIP's conversion of incoming data into a raster image is often called "rendering" or "rasterizing." In printers without data compression, the full, uncompressed rendered page is stored in the buffer 28.

RIP 26 is typically implemented in firmware. The firmware guides the CPU 24 to perform the data rendering process. Alternatively, the printer may have a dedicated RIP unit having a processor.

Print buffer 28 is the printer's memory for storing one or more to-be-printed pages. This is typically a volatile memory or RAM (random access memory). This may also be called the "raster memory" because it typically stores the raster image of to-be-printed pages.

Having a large buffer is beneficial for smooth and reliable printing. It also allows a printer to actually print as fast as the print engine is capable. Despite the technological reasons to maximize the buffer, manufacturers prefer to minimize the buffer to remain cost competitive with other printer manufacturers. Therefore, substantial effort is directed to reducing the amount of required memory in a laser printer. The most common approach is to employ data compressors.

Compressor 30 compresses rendered data from the RIP 26. The compressed data is stored in the buffer 28. Thus, minimizing the memory required for each rendered page. Compressor 30 includes two or more data-compression engines for compressing the rendered data. The engines are classified as either "lossless" data-compression engines 32 or "lossy" data-compression engines 34.

Lossless data-compression engines 32 are used to compress data so that it may be re-expanded back into its original form without any loss of information. Lossless engines are typically used with text, graphics, and halftone data types.

Lossy data-compression engines 34 are used to compress data where the re-expansion of the compressed data may result in loss of information. However, the small differences between the original and a decompressed version of the same data are typically not humanly noticeable. The resulting data compression ratio of lossy engines is typically significantly better than the ratio achieved by lossless engines.

Lossy data-compression engines are a better for specific data types where the enhanced compression ratio outweighs the apparently difficult-to-see loss of information. Lossy engines are typically used with natural-image data types.

The printer may also include a separate decompressor (not shown). A decompressor simply does the opposite of the compressor. It decompresses the compressed rendered data in the buffer 28 using the reverse of whichever compression engine that compressed the original data.

As illustrated in FIG. 1 and described herein, the compressor 30 incorporates a decompressor and corresponding lossless and lossy data-decompression engines. Thus, references herein to a "decompressor" refer to the compressor 30 of the example printer shown in FIG. 1. Moreover, references to implementations of the compressor 30 correspond to similar implementations for a decompressor.

Compressor 30 is typically implemented in firmware. The firmware guides the CPU 24 to perform the data compression/decompression process. Alternatively, the printer may have dedicated compression/decompression units having one or more processors.

Page analyzer 36 examines data rendered by the RIP 26 to identify data types and determine which data-compression engine to use. Thus, the analyzer 36 directs the compressor 30 to compresses specific data using specific data-compression engines. Alternatively, the analyzer 36 and the compressor 30 may be one unit. This exemplary fast page analyzer is implemented by the analyzer 36.

Analyzer 36 is typically implemented in firmware. The firmware guides the CPU 24 to perform the data analysis process. Alternatively, the printer may have a dedicated data analysis unit having a processor.

Print engine 40 includes the logic and physical mechanics to actually print a page. The print engine 40 draws paper from media supply 42 and toner from toner supply 44. Based upon uncompressed rendered data that it receives, the print engine 40 physically prints the page image represented by that rendered data. Modifying a metaphor to further explain, the print engine is where the "toner meets the paper."

In a typical laser printer, the print engine generates that actual page as it receives the rendered data. A rendered page consists of horizontal lines of pixels. The print engine generates the image in up-and-down and across fashion as it receives the rendered data in the same fashion.

Data Types

FIG. 1 provides an example of a typical printed page 50 that includes the three of the four data types. "Text" data type is shown at 52. "Graphics" or "line art" data type is shown at 54. "Natural" image data type is shown at 56. No example of a "halftone" image is shown on page 50 of FIG. 1, but an example is discussed later and shown in FIGS. 6 and 7.

"Text" typically consists of letters, numbers, words, sentences, and paragraphs. "Graphics" are typically computer-generated images. Line-art is a type of graphic consisting entirely of lines, without any shading. Text, graphics, and line art are best compressed using a lossless compression engine. This is because the human eye can easily see any data loss resulting from decompression. In addition, lossless compression engines compress these data types well because they include a high-degree of redundancy.

"Natural" images are digitized images that are typically captured from the real world. Often, they are digitized representations of photographs. Natural images are best compressed using a lossy compression engine because the enhanced compression ratio outweighs the apparently difficult-to-see loss of information.

Exemplary Printed Page

FIG. 2 illustrates examples of horizontal strips of a page. FIG. 2 shows a magnified illustration of page 50 in FIG. 1.

FIG. 2 shows page 70 divided into ten horizontal strips. These strips are labeled A–J from top to bottom. Each strip extends all the way across the page. Although it is not shown here, each strip includes multiple lines and each of those lines extends all the way across the page. Each line is formed from a series of pixels in a horizontal sequence.

Suppose, for example, that page in FIG. 2 includes two hundred (200) lines up-and-down and that each line has a thousand (1000) pixels across. Suppose further that a strip is defined to be twenty (20) lines. In this example, there are ten (10) strips on the page as shown in FIG. 2.

The exemplary fast page analyzer divides each page into horizontal strips like those illustrated in FIG. 2. The analyzer concurrently compresses and analyzes each strip.

Methodological Implementation of Fast Page Analyzer

Figure 3A:
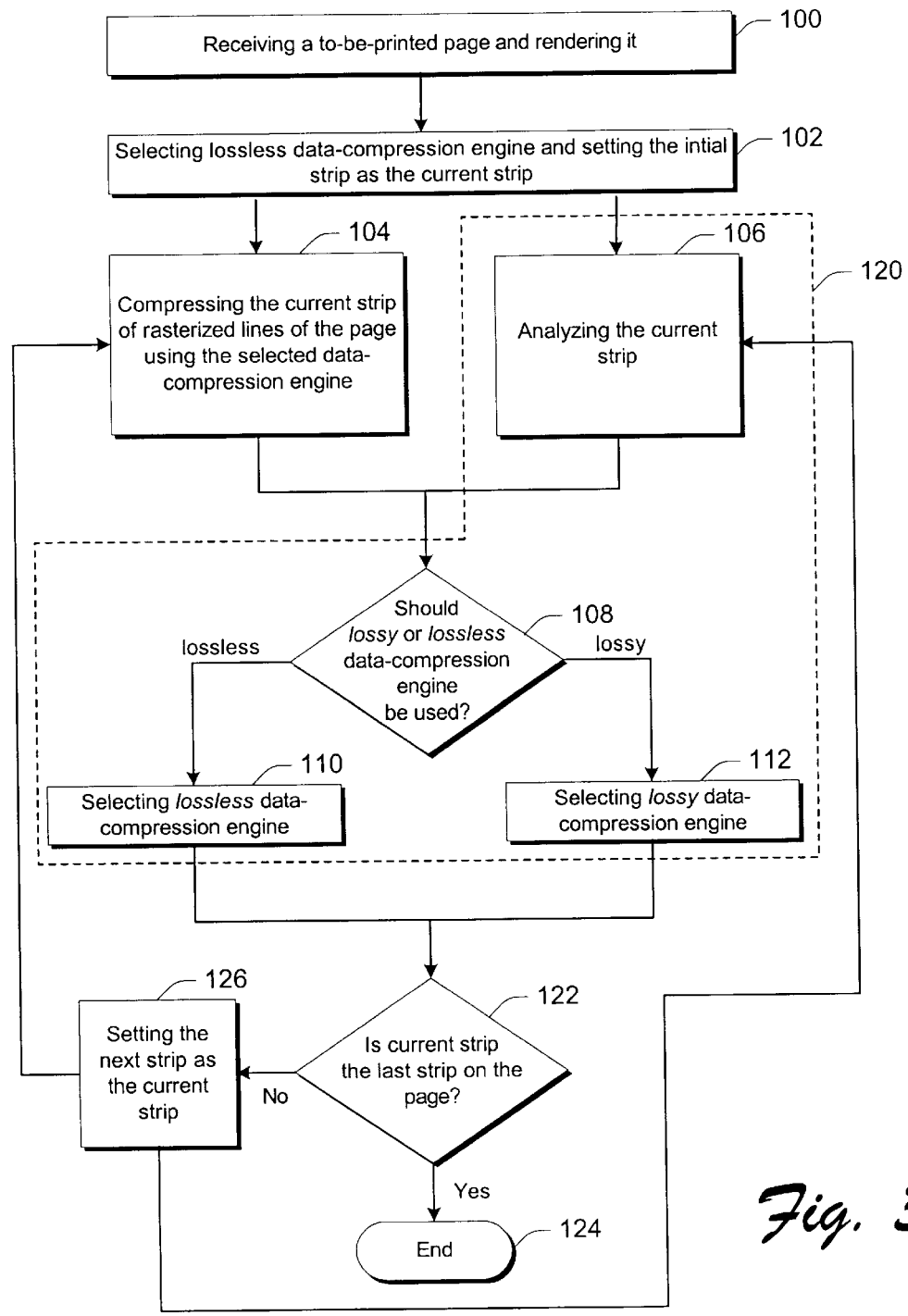
FIG. 3a is a flow diagram of a process implementing the exemplary fast page analyzer.

FIG. 3a illustrates a process implementing the fast page analyzer. At 100, the printer receives a to-be-printed page and the RIP renders it. As the data is rendered, it is sends the data to the analyzer and the compressor. Alternatively, the entire rendered page may be stored before being analyzed by the analyzer and the compressor.

Each page is divided into horizontal strips across the page like the strips shown in FIG. 2. Each strip includes a given number of lines. In the exemplary implementation, the number of lines per strip is programmably adjustable.

At 102 in FIG. 3a, the "current strip" is set to be the first strip on the page. In addition, the lossless compression engine is the selected engine. This means that the first strip is always compressed using the lossless compression engine. The lossless engine is chosen because nothing is known about the first strip. It is safest to use the lossless engine because no data will be lost.

Although the initial strip may include a natural image which is best compressed using a lossy engine, the lossless engine is chosen here without analyzing the initial strip. This small loss in efficiency is overcome by the efficiency of concurrent analysis and compression of the first strip. Alternatively, the analyzer may examine the first strip before selecting the proper engine to compress.

At 104, the compressor compresses the current strip using the selected lossless compression engine. The current strip is the initial strip on the page and the selected engine is the lossless engine.

At 106, the analyzer examines the current strip and does so concurrently with the compressor compressing the current strip of block 104. Since compression and analysis of the same strip is occurring concurrently, overall page analysis and compression is inherently faster than conventional page segmentation.

During the analysis of the current strip, the analyzer tracks "intraline" and "interline" statistics. After the current strip is compressed and analyzed, at 108, the analyzer uses these statistics to predict the best compression engine to compress the next strip. The analyzer uses these statistics to determine if the data type contained in the strip is primarily text, graphics, halftone images, or natural images.

If it appears to be primarily text, graphics, or halftone images, then the lossless data-compression engine is selected at 110. If it appears to be primarily natural images, then the lossy data-compression engine is selected at 112.

Figure 3B:
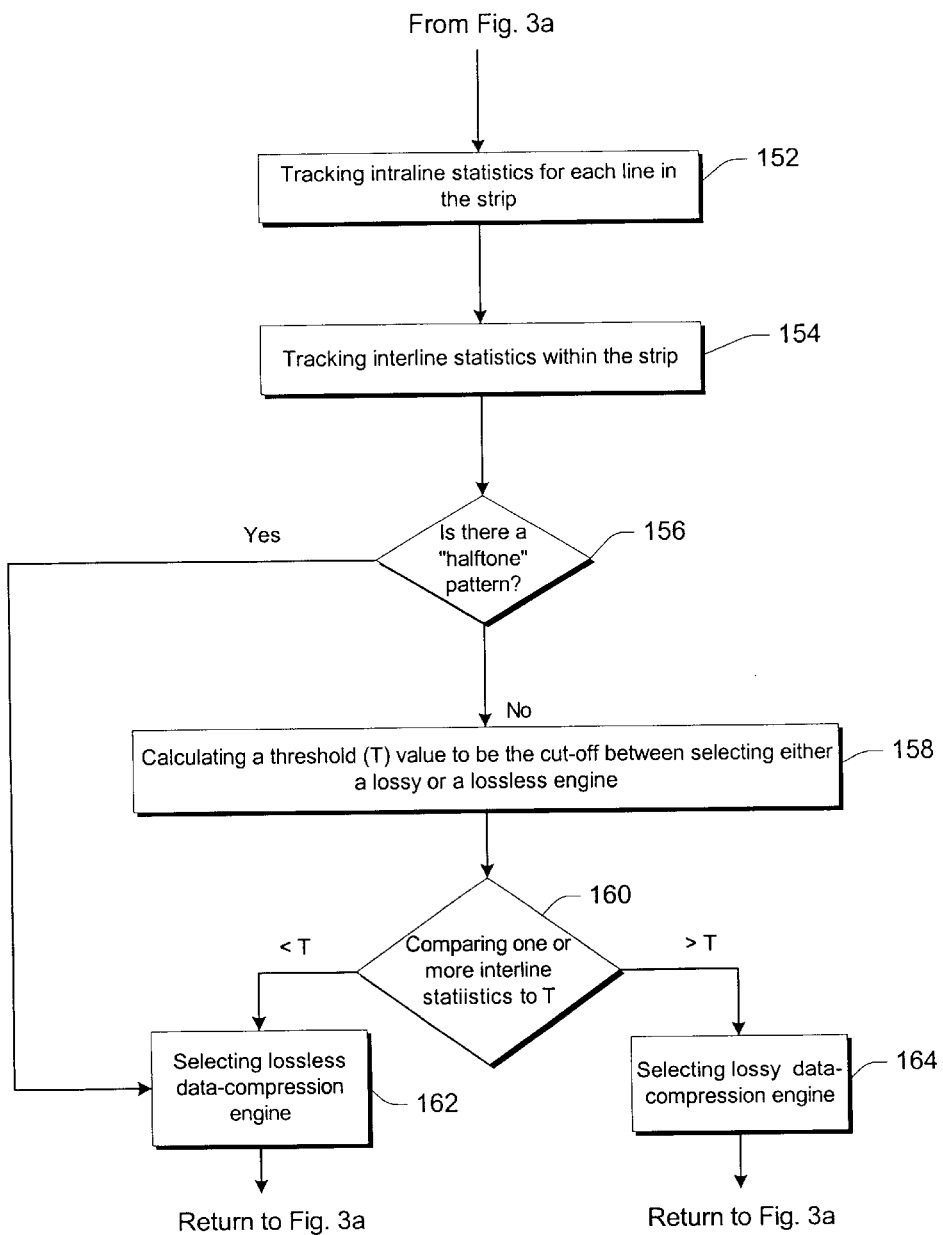
FIG. 3b is a flow diagram detailing a portion of flow diagram of FIG. 3a that is inside a dashed box 120.

Dashed box 120 encompasses blocks 106, 108, 110, and 112. These represent data analysis, data-type determination, and compression-engine selection. The implementation details of dashed box 120 are shown in FIG. 3b and discussed below in the "Implementation Details of Analysis, Determination, & Selection" section.

Continuing with the process illustrated in FIG. 3a, the printer determines if the current strip is the last strip on the page at 122. It does this after blocks 110 and 112 where the proper data-compression engine is selected.

If the current strip is not the last, then the next strip is set as the current strip at 126. From block 126, the process returns to blocks 104 and 106 where the current strip is concurrently compressed and analyzed. The analyzer examines the now current strip and the compressor compresses the current strip. The current strip is compressed using the compression engine selected at blocks 108, 110 and 112.

This loop of blocks 104, 106, 108, 110, 112, and 122 continues until the current strip is the last strip on the page. At that point, the process ends at 124. The compressed, rendered, to-be-printed page is stored in the buffer.

Implementation Details of Analysis, Determination, & Selection

FIG. 3b illustrates the implementation details of dashed box 120 in FIG. 3a. This process continues from block 102 of FIG. 3a. At 152 and 154 in FIG. 3b, the analyzer tracks "intraline" and "interline" statistics of the current strip.

"Intraline" statistics are derived from values of the pixels within a single line. Each line has its own intraline statistics. These statistics are not derived from information obtained from other lines.

In the exemplary implementation, one intraline statistic that the analyzer calculates for each line is pixel-value entropy ($P_e$). Each colored pixel has three values, one value for each color: red, green, and blue (RGB). Therefore, there is a red $P_e$, a green $P_e$, and a blue $P_e$ for each line. Typically, each color value for a pixel ranges from zero (0) to two hundred fifty-five (255).

A line has low entropy (and thus a low $P_e$ value) when the color values of the pixels across the line do not change or change little. A line has high entropy (and thus a high $P_e$ value) when the color values of the pixels across the line change frequently.

The analyzer calculates the pixel-value entropy of a line by keeping a running count as it scans across the line. The analyzer increments that count in its scan each time it encounters a pixel having value different from the value of its immediately previous neighbor.

For example, the count is incremented by one when one pixel has a value of twelve, but its immediately previous neighbor has a value of ten. The count would not be incremented when one pixel has a value of twenty and its immediately previous neighbor also has a value of twenty.

In another example, suppose there are a thousand pixels per line. Suppose that every pixel in that line is exact same value (124) of blue. In this example, the blue $P_e$ of that line would be zero (0) because the pixels never change values. This is the minimum possible value for $P_e$.

Suppose another line has no neighboring pixels with the same value of blue. In this example, the blue $P_e$ of that line would be a thousand (1000) because every neighboring pixel changes values. This is the maximum possible value for $P_e$.

At 152 of FIG. 3b, the analyzer calculates the intraline statistics of each line in the current strip. Specifically, the analyzer determines the three $P_e$ values for each line. At 154 in FIG. 3b, the analyzer calculates several "interline" statistics.

"Interline" statistics are determined from information derived from multiple lines within a strip. These statistics provide information about the lines in a strip. In particular, the intraline statistics of lines in a strip are used to determine the intraline statistics of the strip.

In the exemplary implementation, the analyzer calculates the following interline statistics:

The maximum $P_e$ of a line within the strip ($L_{max}$);

The minimum $P_e$ of a line within the strip ($L_{min}$);

The line history of $P_e$ values of a given number of previous lines in the strip ($L_{hist}$);

The median $P_e$ of the lines within the strip ($L_{med}$);

The mean $P_e$ of the lines within the strip ($L_{mean}$).

These statistics are used to select the most appropriate data-compression engine.

The $L_{max}$ interline statistic is the value of the maximum $P_e$ of a line within a strip. The minimum $P_e$ of a line within a strip is the $L_{min}$ interline statistic. The $L_{med}$ interline statistic is the median $P_e$ of the lines within a strip. The $L_{mean}$ interline statistic is the mean (i.e., average) $P_e$ of the lines within a strip.

The line history $L_{hist}$ interline statistics track a history of $P_e$ values going back given number of lines. N is a variable that represents the given number of lines that the history is kept. N can be programmably adjusted. The line history may also be represented by this: $L_{x-1}, L_{x-2}, \ldots, L_{x-n}$.

Normally, this line history is reset when starting a new strip and only extends as far back as the first line in a strip. However, the line history can extend back across multiple strips. In addition, it might be reset based upon some event other than the start of a new strip. The line history is kept to help the analyzer identify "halftone" patterns.

Figure 6:
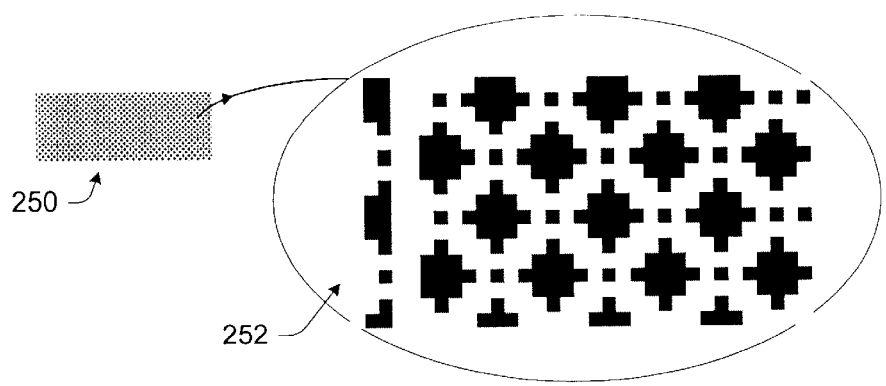
FIG. 6 is a diagram illustrating block of a "halftone" image and a magnification of such block.
Figure 7:
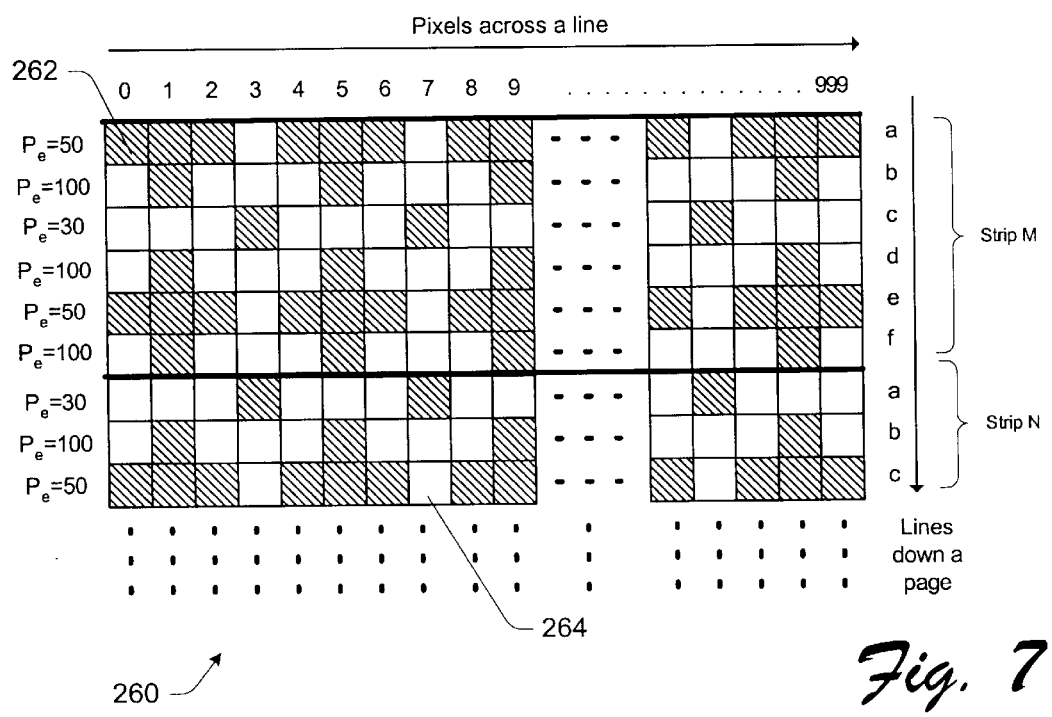
FIG. 7 is a diagram shows strips of a page to illustrate the calculation of intraline and interline statistics. The illustrated strips contain "halftone" data.

At 156 in FIG. 3b, the analyzer determines if the strip appears to include a "halftone" pattern. FIGS. 6 and 7 shows an example of a "halftone" pattern and the example is discussed below. The analyzer uses the line history to do this pattern identification. Specifically, it determines whether there is a pattern of lines near $L_{min}$ and $L_{max}$ in an alternating fashion. Such a pattern is indicative of a halftone image. If the current strip is determined to have such a halftone pattern, then the lossless data-compression engine is selected at 162 in FIG. 3b.

If the analyzer does not identify a halftone pattern in the current strip, then a threshold value (T) is calculated at 158. This threshold value is the value used to determine whether a strip is best compressed using either lossy or lossless engines. The threshold may have a set value such as one hundred. Alternatively, it may be a calculated value that is a percentage of $L_{max}$ of a strip. Where Y is a percentage, the threshold formula is:

$$T=Y*L_{max}$$

Threshold (T) Formula

Using this formula, suppose that Y is sixty percent (60%) and $L_{max}$ is eight hundred (800). T equals five hundred (480).

At 160, the analyzer compares T to $L_{mean}$. Thus, the average of the $P_e$ of all of the lines in the strip is compared to the threshold value. Alternatively, the analyzer may compare T to $L_{med}$.

If the line average is less than the threshold ($L_{mean}<T$), then the lossless data-compression engine is selected at 162.

The line average being less than the threshold indicates that the strip includes lines with low entropy. This means that the strip most likely includes text and graphics. Therefore, a lossless engine should be used to compress it.

However, if the line average is greater than the threshold ($L_{mean}>T$), then the lossy data-compression engine is selected at 164. The line average being greater than the threshold indicates that the strip includes lines with high entropy. This means that the strip most likely includes natural images. Therefore, a lossy engine should be used to compress it.

If the line average is equal to the threshold ($L_{mean}=T$), then neither engine is preferred. One or the other may be chosen by default. If this happens frequently, this will be an indication that percentage (Y) used to calculate the threshold should be adjusted.

After the proper engine is selected, the process goes back to blocks 122 of FIG. 3a.

Illustrative Examples

Figure 4:
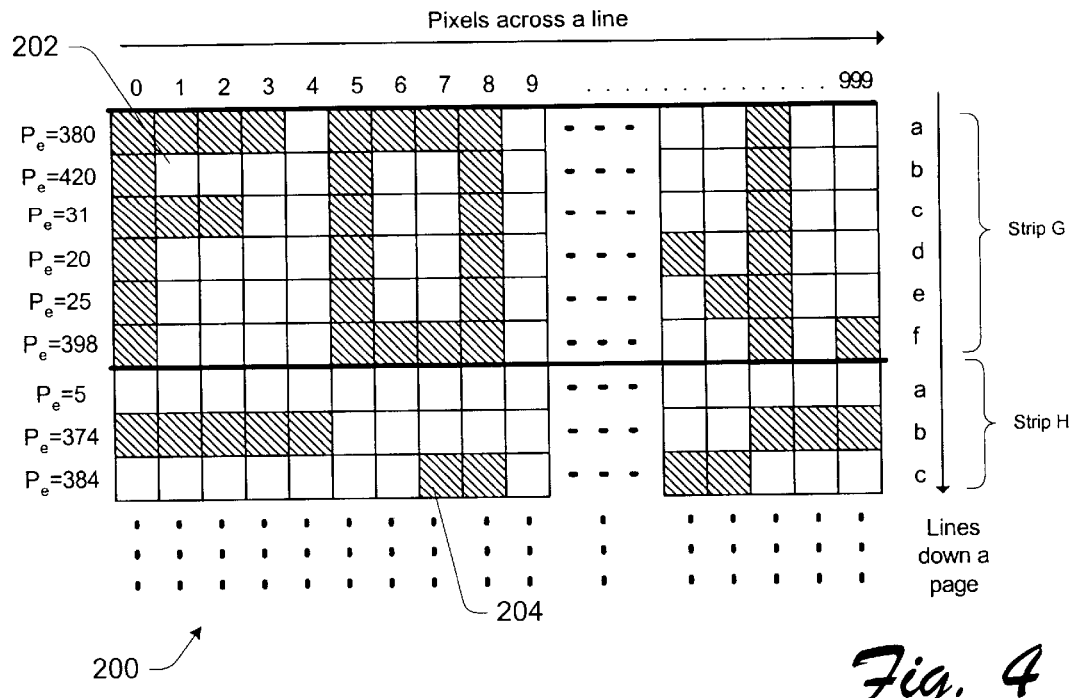
FIG. 4 is a diagram shows strips of a page to illustrate the calculation of intraline and interline statistics. The illustrated strips contain "graphics" data.
Figure 5:
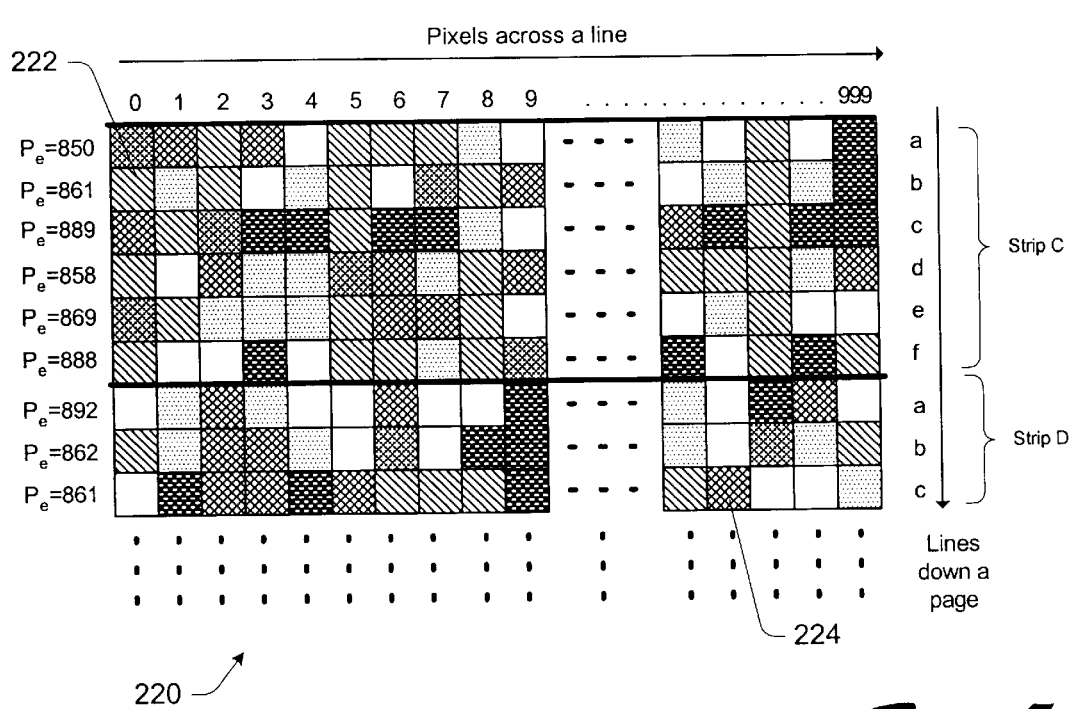
FIG. 5 is a diagram shows strips of a page to illustrate the calculation of intraline and interline statistics. The illustrated strips contain "natural image" data.

FIGS. 4–7 illustrate examples of the data types. In particular, FIGS. 4, 5, and 7 illustrate magnifications of images of a specific data type. The magnifications show pixels, lines, a strip, and a portion of another strip of rendered images. The continuation of lines and strips are depicted by "- - -".

For these examples, each strip contains six (6) lines, which are labeled "a" through "f" on the right side of the image. Also for these examples, each line contains a thousand (1000) pixels, which are labeled "0" through "999" across the top of the image. Furthermore, listed on the left side of the images next to each line is a pixel-entropy value ($P_e$) for its adjacent line. Above and to the right of each image are directional arrows. The arrows indicate the typical direction in which analysis and compression are preformed. The arrows also indicate the direction in which the printer typically prints a page contain the exemplary images.

Each pixel has a specific Cartesian mapped coordinates on the page that may be referenced by its relative strip, line, and pixel location. For example, the pixel at 202 in FIG. 4 may be referred to at being at "Gb1" for strip G, line b, and pixel location 1. Pixel 204 in FIG. 4 has the label Hc7. In FIG. 5, pixel 222 has a label Cb0 and pixel 224 has the label Dc997. In FIG. 7, pixel 262 has a label Ma0 and pixel 264 has the label Nc7.

In these examples, the rendered image shows only one color component of a RGB page. Specifically, these examples depict only the green plane. The different patterns of the pixels in these examples indicate different values of green. The blank pattern indicates a zero (0) value of green.

In these examples, it is assumed that each strip contains only one data type across the entire page. The exemplary implementation of the fast page analyzer makes this same assumption. Although this is not a theoretically accurate assumption, it is a practically accurate assumption. Typically, one data type will dominate each strip and will strongly influence the intraline and interline calculations. The speed of the page analysis and compression engine selection of the exemplary fast page analyzer outweighs the loss of theoretical accuracy of data type identification.

Example of Strips Containing "Text" Data

FIG. 4 shows a portion of a rendered image on a page at 200. This portion represents strips G and H from page 70 of FIG. 2. The rendered image of these strips is primarily text. The text data type is best compressed using the lossless data-compression engine.

For this example, all of the blank pixels in the rendered image, like pixel Gb1 at 202, have a green value of zero (0).

For this example, all of the patterned pixels in the rendered image, like pixel Hc7 at 204, have a green value of one hundred (100).

Using the flowcharts of FIGS. 3a and 3b, strip G and part of strip H of FIG. 4 are analyzed and compressed below. The lossless engine was selected because of the analysis of strip F in FIG. 2. At 126, strip G is set as the current strip and the process loops back to blocks 104 and 106.

At 104, strip G is compressed using the selected engine (which is the lossless engine). Concurrently, strip G is analyzed. This analysis corresponds to block 106 in FIG. 3a and blocks 152 and 154 in FIG. 3b.

During the analysis, the $P_e$ values of the lines in strip G are calculated to is be what is shown in FIG. 4. The analyzer calculates the interline statistics for strip G to determine the following interline statistics:

$L_{max}$=420 (for line b of strip G);

$L_{min}$=20 (for line d of strip G);

The history of $P_e$ values going four lines back; and $L_{mean}$=212 (rounded down).

At block 156 in FIG. 3b, the analyzer determines if there is a "halftone" pattern in strip G. Using the line history, $L_{max}$, and $L_{min}$, it determines that there is no such pattern.

At block 158 of FIG. 3b, the analyzer calculates the threshold value (T). Based upon the Threshold Formula given above where Y is 60%, T equals 252. At block 160, $L_{mean}$ is compared to T. $L_{mean}$ (212) is less than T (252); therefore, the lossless engine is selected at 162 of FIG. 3b.

Since strip G is not the last strip on that page, strip H is set to be the current strip at 126 of FIG. 3a. The process loops back to compression at 104 and analysis at 106. Strip H is compressed using the lossless compression engine. This selection was made based upon the above-described analysis of strip G. Also, strip H is analyzed to determine how strip I (in FIG. 2) should be compressed.

Example of Strips Containing "Natural Image" Data

FIG. 5 shows a portion of a rendered image on a page at 220. This portion represents strips C and D from page 70 of FIG. 2. The rendered image of these strips is primarily a natural image. The natural-image data type is best compressed using the lossy data-compression engine.

FIG. 5 illustrates pixels having a mixture of different patterns. Each differing pattern represents a different shade (value) of green. The visual differences between the rendered images of FIGS. 4 and 5 are easily seen by comparing them side-by-side.

Using the flowcharts of FIGS. 3a and 3b, strip C and part of strip D of FIG. 5 are analyzed and compressed below. The lossy engine was selected because of the analysis of strip B in FIG. 2. At 126, strip C is set as the current strip and the process loops back to blocks 104 and 106.

At 104, strip C is compressed using the lossy compression engine. Concurrently with the compression, strip C is analyzed. This analysis corresponds to block 106 in FIG. 3a and blocks 152 and 154 in FIG. 3b.

During the analysis, the $P_e$ values of the lines in strip C are calculated to be what is shown in FIG. 5. The analyzer calculates the interline statistics for strip C to determine the following interline statistics:

$L_{max}$=889 (for line c of strip C);

$L_{min}$=850 (for line a of strip C);

The history of $P_e$ values going four lines back; and $L_{mean}$=869 (rounded down).

At block 156 in FIG. 3b, the analyzer determines if there is a "halftone" pattern. Using the line history, $L_{max}$ and $L_{min}$, it determines that there is no such pattern.

At block 158 of FIG. 3b, the analyzer calculates the threshold value (T). Based upon the Threshold Formula given above where Y is 60%, T equals 533 (rounded down). At block 160, $L_{mean}$ is compared to T. $L_{mean}$ (869) is greater than T (533); therefore, the lossy engine is selected at 164 of FIG. 3b.

Since strip C is not the last strip on that page, strip D is set to be the current strip at 126 of FIG. 3a. The process loops back to compression at 104 and analysis at 106. Strip D is compressed using the lossy compression engine. This selection was made based upon the above-described analysis of strip C. Also, strip D is analyzed to determine how strip E (in FIG. 2) should be compressed.

Example of Strips Containing "Halftone" Data

FIG. 6 shows an example of a "halftone" rectangular block at 250. Block 252 represents a magnified portion of the halftone block 250. Although a "halftone" image may appear to be a "natural image", it is more similar to the graphics data type.

As shown in FIG. 6, halftone images include repetitive groupings of pixels (i.e., cells). These repetitive cells are more apparent in the magnification block 252. The repetitive nature of the typical halftone image makes them better to compress using a lossless engine over a lossy engine.

FIG. 7 shows a portion of a rendered image on a page at 260. This exemplary rendered image is not taken from FIG. 2.

This exemplary rendered image is the "halftone" data type. FIG. 7 illustrates groupings of pixels having repetitive patterns. Although the natural image of FIG. 5 and the halftone image of FIG. 7 typically are used to represent photographs, the visual differences between the two types rendered images of FIGS. 5 and 7 are easily seen by comparing them.

Again, using the flowcharts of FIGS. 3a and 3b, strip M and part of strip N of FIG. 7 are analyzed and compressed below. For this example, suppose that the lossless engine was selected after the analysis of the strip before strip M. At 126, strip M is set as the current strip and the process loops back to blocks 104 and 106.

At 104, strip M is compressed using the lossless compression engine (because this the selected engine in this example). Concurrently with the compression, strip M is analyzed. This analysis corresponds to block 106 in FIG. 3a and blocks 152 and 154 in FIG. 3b.

During the analysis, the $P_e$ values of the lines in strip M are calculated to be what is shown in FIG. 7. The analyzer calculates the interline statistics for strip M to determine the following interline statistics:

$L_{max}$=100 (for lines b, e, and f of strip M);

$L_{min}$=30 (for line c of strip M);

The history of $P_e$ values going four lines back; and $L_{mean}$=72 (rounded up).

At block 156 in FIG. 3b, the analyzer determines that there is a halftone pattern. Using the line history, $L_{max}$, and $L_{min}$, it determines that there is such a pattern.

Specifically, the following formula is used to mathematically determine if a halftone pattern exists:

$$[(L_{max}, x) \pm \epsilon, (L_{min}, x \pm 1) \pm \epsilon]$$

Halftone Formula

This formula is performed over N number of lines back. In this example, it is four lines back. In this formula, x is the current line, x±1 is the next line (or the previous line), and E (epsilon) is the error allowed. Epsilon may be a set value or an adjustable value.

The lines in a halftone image will alternate in a pattern of $P_e$ values near $L_{min}$ or $L_{max}$. The values will not necessary be exactly $L_{min}$ or $L_{max}$, but they will the near it. However, given the nature of the halftone cell (which is a repeating pattern) the $P_e$ values will be close to either $L_{min}$ or $L_{max}$. Epsilon allows line's $P_e$ values to be approximated as either $L_{min}$ or $L_{max}$ as long as it is within a certain tolerance of the real $L_{min}$ and $L_{max}$.

Suppose a strip has a halftoned pattern and the halftone cell is a 2×2. In that case, the $P_e$ values of lines alternate between $L_{min}$ and $L_{max}$ (within a certain tolerance). Given this image, the $L_{mean}$ would be exactly halfway between the $L_{min}$ and $L_{max}$, since every line is either a maximum line or a minimum line.

The process determines if there is a halftone pattern using the above Halftone Formula before using the Threshold Formula of blocks 158 and 160 of FIG. 3b. If a strip includes a halftone image, the Threshold Formula often indicates that a lossy engine should be selected rather than the lossless. Therefore, the strip is first tested to see if it includes a halftone pattern before proceeding with the tests using the Threshold Formula.

For example, suppose no halftone pattern was identified in block 156 of FIG. 3b, the analyzer (at 158) would calculate the threshold value (T) of strip M. Based upon the Threshold Formula given above where Y is 60%, T equals 60. At block 160, $L_{mean}$ would be compared to T. $L_{mean}$ (72) is greater than T (60); therefore, the lossy engine would be erroneously selected in this example.

After block 156 of FIG. 3b where the halftone pattern was correctly identified, the process skips to 162. Since strip M is not the last strip on that page, strip N is set to be the current strip at 126 of FIG. 3a. The process loops back to compression at 104 and analysis at 106. Strip N is compressed using the lossless compression engine. This selection was made based upon the above-described analysis of strip M. Also, strip N is analyzed to determine how strip O (not shown) should be compressed.

Methodological Implementation of Decompression

Figure 8:
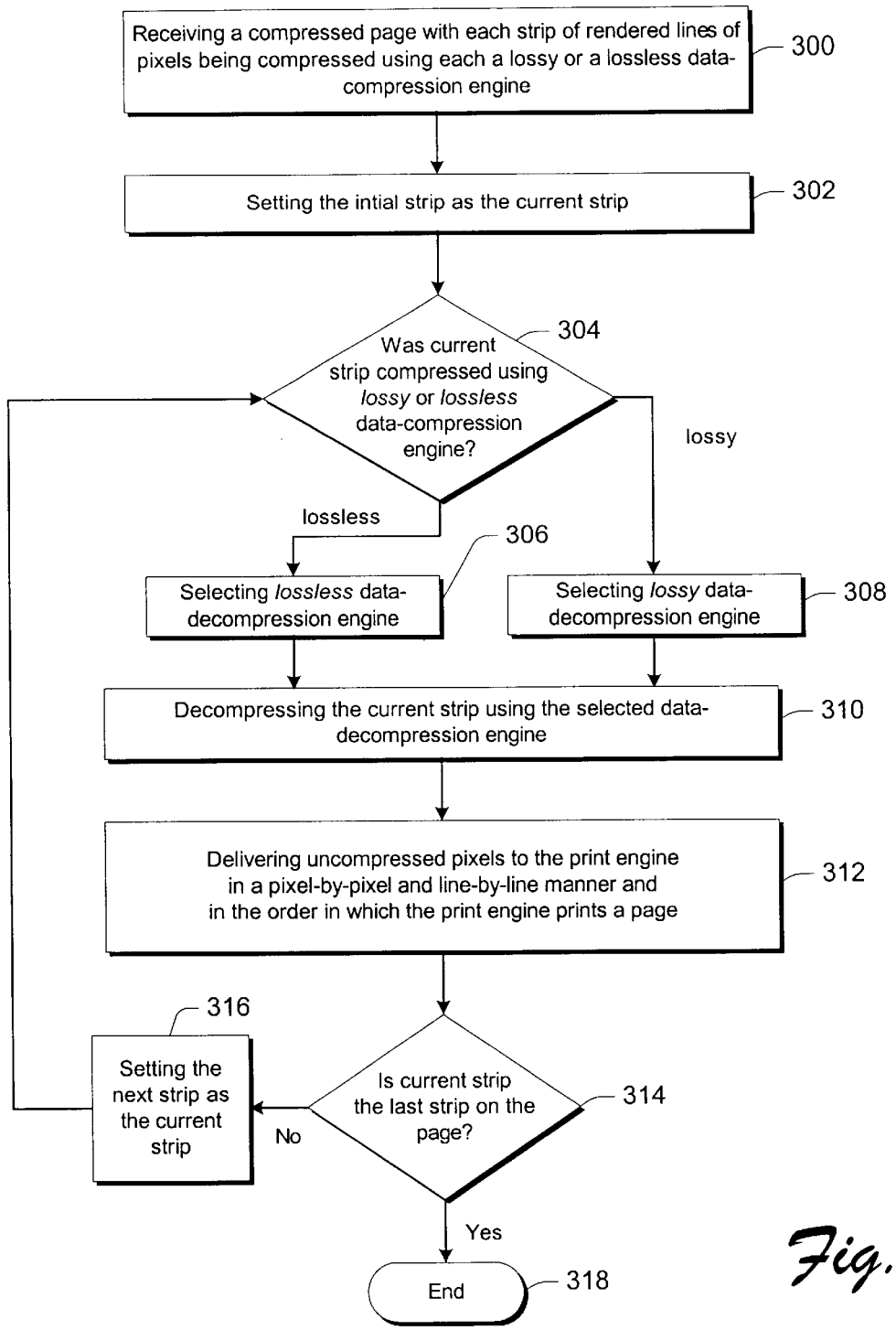
FIG. 8 is a flow diagram of a process implementing decompression of a page compressed according to the exemplary fast page analyzer.

FIG. 8 illustrates a process implementing the decompression performed after a page has been compressed using the fast page analyzer. At 300, the decompressor receives a compressed page with each strip of rendered lines of pixels being compressed using either a lossy or a lossless data-compression engine.

At 302, the initial strip is set as the current strip. At 304, the decompressor determines whether the strip was compressed using a lossy or lossless data-compression engine. When the page was originally compressed, an associated engine-indicating value was stored for each strip. That engine-indicating value identifies which engine was used to compress the associated strip. Alternatively, there may be signature pattern or code included within the compressed data itself that identifies how it was compressed.

If the data in the current strip was compressed using a lossless engine, then it is the appropriate lossless decompression engine is selected at 306. If the data in the current strip was compressed using a lossy engine, then it is the appropriate lossy decompression engine is selected at 308.

At 310, the current strip is decompressed using the selected decompression engine. At 312, the uncompressed pixels from block 310 are sent to the print engine in a pixel-by-pixel and line-by-line manner. They are also sent in the order that the print engine prints the page.

At 314, the printer determines if the current strip is the last strip on the page. If the current strip is not the last, then the next strip is set as the current strip at 316. From block 316, the process returns to block 304 where the decompressor determines which compression engine was used to compress the current strip. The process loops for all the strips to be decompressed. It continues until the current strip is the last strip on the page. When that happens, the process ends at 318.

Computer-executable Instructions

An implementation of the invention may be described in the general context of computer-executable instructions, such as program modules, executed by one or more computers, printers, or other devices. Generally, program modules include routines, programs, objects, components, firmware, application-specific integrated circuits (ASICs), data structures, etc. that perform particular tasks or implement particular abstract data types. Typically, the functionality of program modules may be combined or distributed as desired in various embodiments.

Computer Readable Media

An implementation of the exemplary fast page analyzer may be stored on or transmitted across some form of computer readable media. Computer readable media can be any available media that can be accessed by a computer or printer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as radio frequency (RF), acoustic, infrared, and other wireless media. Combinations of any of the above are also included within the scope of computer readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A data-compression engine selection method comprising:

analyzing a strip of rendered lines of a to-be-printed page;

determining whether the strip should be compressed using either a lossy or a lossless data-compression engine; and selecting either the lossy or the lossless data-compression engine.

2. A method as recited in claim 1, wherein the analyzing comprises tracking one or more intraline statistics based upon pixels in a rendered line in the strip.

3. A method as recited in claim 2, wherein the interline statistics comprise a pixel-value entropy ($P_e$) across a line, the $P_e$ indicating changes in values of successive pixels across a line.

4. A method as recited in claim 1, wherein analyzing comprises:
  tracking one or more intraline statistics based upon pixels in a rendered line in the strip, the interline statistics comprising a pixel-value entropy ($P_e$) across a line, the $P_e$ indicating changes in values of successive pixels across a line; and
  tracking interline statistics based upon one or more intraline statistics of lines in the strip.

5. A method as recited in claim 4, wherein
  the intraline statistics comprise a maximum $P_e$ of a line in a strip ($L_{max}$) and a minimum $P_e$ of a line in a strip ($L_{min}$); and
  the determining comprises recognizing an alternating pattern of lines where the $P_e$ of one line is near $L_{max}$ and the $P_e$ of next line is near $L_{min}$; and
  the selecting comprises choosing a lossy data-compression engine.

6. A method as recited in claim 4, wherein the intraline statistics comprise a mean of $P_e$ of lines in a strip ($L_{mean}$).

7. A method as recited in claim 6, wherein determining comprises comparing $L_{mean}$ to a threshold value (T).

8. A method as recited in claim 7, wherein
  the intraline statistics further comprise a maximum $P_e$ of a line in a strip ($L_{max}$) and a minimum $P_e$ of a line in a strip ($L_{min}$); and
  the determining comprises calculating the threshold value (T) based upon the $L_{max}$ and the $L_{min}$.

9. A method as recited in claim 7, wherein the selecting comprises:
  selecting a lossless data-compression engine if $L_{mean}$ is less than the threshold value (T);
  otherwise, selecting a lossy data-compression engine if $L_{mean}$ is greater than the threshold value (T).

10. A method as recited in claim 4, wherein the intraline statistics include:
  a maximum $P_e$ of a line in a strip ($L_{max}$);
  a minimum $P_e$ of a line in a strip ($L_{min}$);
  a median $P_e$ of lines in a strip ($L_{med}$); or
  a mean $P_e$ of lines in a strip ($L_{mean}$).

11. A method as recited in claim 1 further comprising compressing a new strip of rendered lines of the page using a data-compression engine selected by the selecting.

12. A method as recited in claim 8 further comprising the following concurrently with compressing:
  analyzing the new strip;
  determining whether the new strip should be compressed using either a lossy or a lossless data-compression engine; and
  selecting either the lossy or the lossless data-compression engine to compress a next strip.

13. A computer-readable storage medium having computer-executable instructions that, when executed by a computer, performs the method as recited in claim 1.

14. A data-compression engine selection method comprising:
  analyzing a first strip of rendered lines of a to-be-printed page;
  determining whether the first strip should be compressed using either a lossy or a lossless data-compression engine;
  selecting a data-compression engine based upon the determining; and
  compressing a second strip of rendered lines of the page using a selected data-compression engine, the second strip being adjacent the first strip.

15. A method as recited in claim 14 further comprising:
  analyzing the second strip;
  determining whether the second strip should be compressed using either a lossy or a lossless data-compression engine, the third strip being adjacent the second strip;
  selecting a data-compression engine based upon the determining of the second strip; and
  compressing the third using a selected data-compression engine.

16. A data-compression method comprising:
  concurrently compressing and analyzing a first strip of rendered lines of a to-be-printed page; and
  predicting whether a next second strip of rendered lines of a to-be-printed page is compressed by either a lossy or a lossless data-compression engine based upon analyzing of the first strip.

17. A data-decompression method comprising:
  decompressing strips of a compressed to-be-printed page, the strips having rendered lines of pixels, wherein each strip is decompressed using a data-decompression engine associated therewith; and
  as strips are decompressed, delivering uncompressed pixels to a print engine, line by line and strip by strip, in order in which the print engine prints a page.

18. An apparatus comprising:
  a processor;
  a rendered page compressor executable on the processor to:
    analyze a strip of rendered lines of a to-be-printed page;
    determine whether the strip should be compressed using either a lossy or a lossless data-compression engine; and
    select either the lossy or the lossless data-compression engine.

19. An apparatus comprising:
  a processor;
  a rendered page compressor executable on the processor to:
    concurrently compress and analyzing a first strip of rendered lines of a to-be-printed page; and
    predict whether a next second strip of rendered lines of a to-be-printed page is compressed by either a lossy or a lossless data-compression engine based upon analyzing of the first strip.

20. A printer comprising:
  a processor;
  a print engine for printing a page;
  a rendered page decompressor executable on the processor to:
    decompress strips of a compressed to-be-printed page, the strips having rendered lines of pixels, wherein each strip is decompressed using a data-decompression engine associated therewith; and
    concurrently deliver uncompressed pixels to the print engine, line by line and strip by strip, in order in which the print engine prints a page.

* * * * *

UNITED STATES PATENT AND TRADEMARK OFFICE
CERTIFICATE OF CORRECTION

PATENT NO. : 6,778,291 B1
DATED : August 17, 2004
INVENTOR(S) : Scott C. Clouthier It is certified that error appears in the above-identified patent and that said Letters Patent is hereby corrected as shown below:

Column 4,
Line 43, delete "mage" and insert in lieu thereof -- image --;

Column 5,
Line 35, delete "in";
Line 58, after "portion" and before "a", insert -- of --;
Line 60, delete "uncompress" and insert in lieu thereof -- uncompressed --;

Column 6,
Line 39, delete "shows" and insert in lieu thereof -- showing --;
Line 42, after "illustrating" and before "block", insert -- a --;
Line 44, delete "shows" and insert in lieu thereof -- showing --;

Column 8,
Line 9, after "are", delete "a";
Line 33, delete "compresses" and insert in lieu thereof -- compress --;

Column 9,
Line 29, after "rendered, it", delete "is";

Column 11,
Line 60, delete "five hundred" and insert in lieu thereof -- four hundred eighty --;

Column 12,
Line 34, delete "preformed" and insert in lieu thereof -- performed --;
Line 36, delete "contain" and insert in lieu thereof -- contained --;
Line 40, delete "at" and insert in lieu thereof -- as --;

Column 13,
Line 14, after "to", delete "is";

Column 14,
Line 42, after "(because this", insert -- is --;

UNITED STATES PATENT AND TRADEMARK OFFICE
CERTIFICATE OF CORRECTION

PATENT NO. : 6,778,291 B1
DATED : August 17, 2004
INVENTOR(S) : Scott C. Clouthier It is certified that error appears in the above-identified patent and that said Letters Patent is hereby corrected as shown below:

Column 15,
Line 2, delete "necessary" and insert in lieu thereof -- necessarily --;
Line 3, delete "the" and insert in lieu thereof -- be --;
Lines 57 and 59, after "engine" and before "is" insert -- that --.

Signed and Sealed this

Second Day of August, 2005

JON W. DUDAS
*Director of the United States Patent and Trademark Office*